UNITED STATES PATENT OFFICE.

JOHN CARNRICK, OF NEW YORK, N. Y., ASSIGNOR, BY MESNE ASSIGNMENTS, TO THE PEPTENZYME COMPANY, OF NEW YORK.

DIGESTIVE COMPOUND.

SPECIFICATION forming part of Letters Patent No. 565,329, dated August 4, 1896.

Application filed August 27, 1894. Serial No. 521,399. (No specimens.)

*To all whom it may concern:*

Be it known that I, JOHN CARNRICK, a citizen of the United States, residing at New York, in the county and State of New York, have invented certain new and useful Improvements in Digestive Compounds; and I do hereby declare the following to be a full, clear, and exact description of the invention, such as will enable others skilled in the art to which it appertains to make and use the same.

This invention relates to a digestive compound adapted for digesting the different kinds and varieties of foods which are taken into the human system, and supplying the cells of the digestive organs with the latent or mother ferment called "zymogen," and thereby aiding the digestive organs to completely prepare food for assimilation and nutrition.

The object of my invention is to provide a digestive compound which will not only digest the different kinds of food substances, such as proteid or nitrogenous food, fatty food, and starchy food, but will perfectly digest and prepare for assimilation in the human system all the varieties of the different classes or kinds of food substances which are taken into the digestive track.

A special object of my invention is to provide a digestive compound which contains not only the active enzyme of the different digestive and glandular organs, which secrete digestive fluids, but also contains the "mother ferment" or mother substance contained within the cellular tissues of the digestive organs, which substance is named "zymogen," and which requires only the vitalizing and developing influence of the digestive organs to become active and most effective in the digestive and assimilative or nutritive processes.

Heretofore pepsin, the artificial active ferment of the stomach, and pancreatin, the artificial active ferment of the pancreas, have been largely prepared and used for aiding digestion, and many years ago I prepared and presented to the trade a compound containing these two active digestive ferments, and also containing diastase from malt and two acids, but all previous artificial substances and compounds have been defective and only partially successful in practice. This has been the case to such an extent as to give rise to widespread skepticism concerning the therapeutic value of commercial pepsin and other digestive ferments as found in the market.

It has been the principal aim of manufacturing chemists to present a preparation of pepsin elegant in appearance and possessing great solubility and strength in one direction and responding to a single test—viz., the solution of coagulated egg albumen. The pepsins in the market, though answering well this single artificial test, often fail in practice to give satisfactory results which will compare favorably with my new digestive compound, which I term "Peptenzyme," for which I have obtained a Trade-Mark Certificate of Registration No. 25,131.

Isolated digestive ferments or enzymes can naturally only represent a single digestive organ, and, as a matter of fact, as usually found in the market they represent only part of the digestive principles of that organ, in consequence of the imperfect method of preparation, while my new preparation, peptenzyme, represents the different digestive enzymes and also the entire digestive principles of all of the digestive organs or glands; that is, the active enzyme and the mother substance or zymogen.

The natural digestive ferments or enzymes all consist of certain soluble matter mixed with some insoluble and easily-decomposed analogous substances, both of which are necessary for the perfect and full digestive functions of the organs; and in my preparation these digestive secretions are obtained and presented to the consumer in such a way as to preserve and retain all the digestive principles as they exist in nature.

As a rule each individual digestive organ produces a ferment which prepares principally one kind of each class of foods for assimilation, and it therefore requires the secretions of all the different organs to properly digest a meal which contains the several kinds of each class of food substances. The stomach, pancreas, Brunner's glands, and Lieberkuhn's follicles secrete principles which convert proteid matter into an assimilable form. The pancreas, liver, and spleen secrete the principles which emulsify fats and convert them into an assimilable form. The pancreas, liver, spleen, salivary, and Brunner's glands and Lieberkuhn's follicles secrete principles which convert starch into glucose and maltose. My experiments confirm this and conclusively demonstrate that the specific secretion from each digestive organ is best adapted for the digestion of each species or variety of each of the different classes of foods.

I have discovered that an extract of the hepatic gland and an extract of the spleen will emulsify and prepare fats for assimilation more perfectly than the extract of the pancreas or the bile, and also convert starch into glucose. An extract from these glands, both of which are constituents of peptenzyme, has the property of aiding the digestion of meat-fibrin or other food containing fat, by dissolving or emulsifying the fat in the interstices and adhering to the surface, or mixed with the food mass and thereby allowing the proteid-digesting enzyme to act at once and rapidly. It is well known that when much fat is taken with a meal digestion is retarded, for the reason that it acts as a barrier or a coating and prevents the immediate contact of proteids with the digestive ferment. It will therefore be seen that the extract from these glands, as a constituent of peptenzyme, largely aids the mechanical and disintegrating action of the stomach in reducing the food to a semiliquid condition and facilitating digestion beyond the stomach. Before my experiments it was not known that these organs, the spleen and liver, contained these principles. The digestive principles of the salivary and Brunner's glands and Lieberkuhn's follicles have never before been isolated and used in a remedy for indigestion and dyspepsia.

I have discovered that the mother ferment or substance which is termed "zymogen" contained in the cells of the digestive organs and which has not yet reached a condition sufficiently developed for activity, is a very important and valuable principle in the digestive process, and I have made it a constituent of my new digestive compound.

My process of preparing digestive enzyme is conducted as follows: The stomach, pancreas, spleen, hepatic, salivary, and Brunner's glands, and Lieberkuhn's follicles are removed as soon as possible from the slaughtered animals, and then the tissues or portions of the gland which contain the digestive secreting-cells and zymogen are carefully dissected from the coarser, fleshy, or muscular tissues, which are rejected. Previous to separating the enzyme glands or cells the glandular organ should be made neutral, if necessary, by the addition of a small amount of a harmless acid or alkali. The secreting-glands are washed with water to remove the mucus, after which they are thoroughly dried, preferably at a temperature of 100° to 110° Fahrenheit and not exceeding 130° Fahrenheit and then reduced to a coarse powder. This powder may be treated with ether or other suitable solvent to remove the fat, after which the powder is again dried, preferably at a temperature of 100° to 110° Fahrenheit and not exceeding 130° Fahrenheit, and is then reduced to a fine powder. The cells containing the albuminous and glutinous digestive secretions being dry, hard, and brittle are readily powdered, while the epidermal tissue or skin, the membrane, and some muscular fiber remains in the form of thin scales or films, which are readily separated by a sieve. A sieve with a moderately fine mesh is used, and as soon as the sieved powder shows a diminution of digestive strength the sieving operation is stopped, and the gruffs or tailings are rejected. The fine powder consists of everything which the enzyme-cells contained, from the digestive secretion in its incipient or primitive condition (mother ferment or zymogen) to the fully-developed digestive enzyme. This powder is then treated with a dilute ethereal solution of gum-benzoin, which protects and preserves the enzyme and zymogen. The mass is then spread out and allowed to dry. Each kind of gland is treated separately, producing each digestive principle by itself, and the prepared powder of each gland is preferably kept in a separate bottle until required for preparing peptenzyme or any other desired mixture or digestive compound.

It should be observed that only the peptic, pancreatic, salivary, Lieberkuhn's and Brunner's glands are treated and powdered as above described.

The spleen and liver require especial treatment, as follows: Both of these glands are well washed and freed from all blood, fat, and tough membrane, and are then chopped very fine and dried, preferably at a temperature from 100° to 110° and not to exceed 130° Fahrenheit. When thoroughly dry, the comminuted mass is powdered and the powder digested with strong alcohol in a vessel on a water-bath. The alcoholic solution may then be evaporated and the alcohol recovered, and the remaining product is further evaporated to the consistence of a stiff extract. This extract of liver or spleen possesses in a striking degree the property of emulsifying fats; also the property of converting starch and cane-sugar into glucose. Should it be desired to prepare the extracts of liver and spleen in a powdered form, the extracts are rubbed up with a suitable proportion of milk-sugar, and when thoroughly incorporated in the form of a granular powder such powder is moistened with an ethereal solution of gum-benzoin and allowed to dry. When the different digestive powders have been benzoated and the odor of ether expelled, they are ready for being mixed with milk-sugar and cane-sugar in proper proportions. To the cane-sugar there is added and thoroughly mixed the proper proportion of citric acid, and to the milk-sugar there is added and thoroughly mixed therewith the desired proportion of hydrochloric acid. The masses of sugar containing the acids having been dried, they are finely sifted, when they are ready to be added to and mixed with the powdered digestive ferments or enzymes. The hydrochloric acid may be omitted and citric acid alone used.

The powdered digestive principles of the different glands having been prepared as above described, and it being desired to produce peptenzyme, they are preferably mixed in such proportion as they are obtained from each organ; that is, the yield of one hundred of each of the glands, as peptic, pancreatic, salivary, and Brunner's glands, and Lieberkuhn's follicles, are mixed with the extracts obtained from one hundred livers and one hundred spleens. In this way a mixture is obtained which represents the digestive secretions in the same proportions that they are furnished by a complete set of digestive organs and glands. To make the powdered mixture more palatable, there is added a small amount of a suitable acid, preferably citric acid, and sugar, prepared as above described.

I wish it understood that my invention in a digestive compound is not limited to a mixture of the powdered product or extract of the seven glands or organs above mentioned, and I propose to mix any two or more of the digestive products together to form a digestive compound. For instance, I may use the prepared product of the peptic glands and the pancreas combined with the prepared product from any one or more of the other five organs above mentioned, or I may combine any two or more of the products to form a compound for any particular purpose. The extract of spleen is a new digestive agent, first prepared by me, and I have found it to be particularly valuable in emulsifying fats and in aiding the digestion of fibrin containing fatty matter or tissue, and I lay claim to the extract of spleen as a digestive agent.

During the whole process of manipulating the separated glands they are kept in a neutral condition until dry, thereby preventing the development of a large portion of their properties. At the time the animal is killed the zymogen or mother ferment is in various stages of development. Its growth is then arrested, and an acid or alkaline condition would render the development of all that portion of the zymogen which has not reached a stage to receive the vital nerve stimulus abortive, and it would consequently be of little value in the digestive track. An important part of my process, therefore, consists in preserving the cell tissue, which contains the zymogen in various stages of development, in the same condition as it exists when the animal is slaughtered, so that when it is taken into the digestive track it will again be under the influence of the natural productive and vital forces, and the development, which has been arrested, will be resumed and brought to perfection, the same as it would have been if the animal had not been slaughtered, and in this state or condition the preparation will become a digestive agent of fiftyfold greater power than it would have been if the ordinary method had been pursued in the extraction of the digestive enzyme. By this process it will be observed that I isolate both the active and mother ferment without the use of acids or alkali, except for neutralizing purposes, as either of these in excess would injure or destroy this delicate immatured form of ferment-cell. It will readily be seen that by my process I obtain the enzyme and zymogen practically in the same condition as they exist in nature, separated from the inert matter.

The digestive products obtained as above described are in such a form as to agree perfectly when mixed, and even assist each other in doing any digestive work required. Peptenzyme readily digests every kind of proteids, fats, starches, and cane-sugar, and acts without any extra addition of acid or alkali. It also successfully digests all these various articles of food at the same time and in the same fluid, which may be either acid or alkaline, which proves that the various digestive ferments contained in it do not interfere with each other.

Peptenzyme powder or any desired mixture of two or more of the described enzyme powders are pressed into disks or tablets in a well-known manner. Peptenzyme elixir is also prepared from the enzyme and zymogen above described, and has been presented to the trade.

Having described my invention, what I claim, and desire to secure by Letters Patent, is—

1. The process of preparing digestive ferments or enzymes and zymogen which consists in removing the tissue or portions of the glands, containing the digestive secreting-cells and the active enzyme, from the muscular tissue and fat, drying said cell tissue, at a temperature below that which would coagulate the albuminous matter, then reducing it to a powder and separating the cells containing enzyme and zymogen from the epidermal scales and muscular fibers, as by sieving.

2. The process of preparing digestive ferments or enzymes and zymogen which consists in removing the portions of the glands containing the digestive secreting-cells and the active enzyme, from the muscular tissue and fat, and drying said cell tissue at a comparatively low temperature, not exceeding 130° Fahrenheit, then reducing it to a powder and separating the cells containing enzyme and zymogen from the epidermal scales and muscular fibers, as by sieving, then treating the digestive powder with a solution of a suitable gum for protecting and preserving it.

3. The process of preparing digestive ferments or enzymes and zymogen which consists in dissecting from the fresh digestive organs or glands the tissues or portions which contain the digestive secreting-cells, so as to remove them from the muscular tissue and fat, which are rejected, drying the cellular substance at a temperature not exceeding 130° Fahrenheit, and then reducing it to a powder, treating said powder with a solvent to remove the fat, then again drying it at a low temperature and reducing to a fine powder, sieving it to remove scales or films of muscular tissue and then treating the resulting powder with a solution of a suitable gum, as benzoin, for protecting and preserving the enzyme and zymogen.

4. The process of preparing digestive enzymes from spleen or liver which consists in finely comminuting the organ, then drying at a low temperature and reducing to powder, then making an alcoholic solution and evaporating the alcohol to form a stiff extract.

5. The process of preparing digestive enzymes from spleen or liver which consists in finely comminuting the organ, then drying at a low temperature and reducing to a powder, then making an alcoholic solution and evaporating the alcohol to form a stiff extract, then rubbing up such extract with a suitable proportion of milk-sugar to form a granular powder, then moistening such powder with a solution of a suitable gum, as benzoin, and allowing it to dry.

6. An artificial digestive preparation containing, in a form capable of preservation, mother ferment or zymogen, possessing its natural function and property of developing and forming active digestive enzyme under the influence of the productive and vital forces in the digestive track of the living subject.

7. An artificial digestive preparation containing, in a form capable of preservation, the active digestive enzyme and the mother ferment or zymogen, the latter being in the various stages of development and possessing the natural properties and functions, which it had when taken from the animal, of developing and forming by internal change, active digestive enzyme, under the influence of the productive and vital forces in the digestive track of the living subject.

8. A digestive preparation or composition containing a digestive extract of spleen and of liver capable of digesting and emulsifying fats.

9. An artificial digestive preparation containing an enzyme extract of spleen adapted for emulsifying and digesting fats.

10. A digestive compound or composition containing, in a form capable of preservation, extracts or enzymes of the salivary, peptic, pancreatic, hepatic and Brunner's glands, Lieberkuhn's follicles and the spleen, mixed in suitable proportions.

11. A digestive compound or composition containing, in a form capable of preservation, the digestive extract or principle of the peptic and pancreatic glands combined with one or more of the enzymes of the salivary, Brunner's and hepatic glands, Lieberkuhn's follicles and spleen.

12. A digestive compound or composition containing, in a form capable of preservation, the active ferment or enzyme and the mother ferment or zymogen of the salivary, peptic, pancreatic, hepatic and Brunner's glands, Lieberkuhn's follicles and spleen, mixed in suitable proportions.

13. A digestive preparation or composition containing the digestive extract or principle separated from one or more of the digestive organs or glands, and in dry powdered form, the grains or particles of which have a protective coating of a suitable gum, as benzoin.

14. A digestive preparation or composition consisting of the cellular matter of one or more of the digestive organs or glands, in the dry, powdered form, and freed from membrane and muscular fiber and containing the enzyme and zymogen, possessing their natural properties and functions.

15. A digestive preparation or composition, in the dry powdered form, and containing digestive enzymes, the grains or particles of which are coated with a suitable gum, as benzoin, for preserving the enzymes, and a suitable proportion of milk-sugar.

In testimony whereof I affix my signature in presence of two witnesses.

JOHN CARNRICK.

Witnesses:
HENRY J. SCHEUBER,
E. H. SCHEUBER.